United States Patent
Kashiwase

(10) Patent No.: US 8,244,254 B2
(45) Date of Patent: Aug. 14, 2012

(54) MOBILE STATION AND BASE STATION

(75) Inventor: Susumu Kashiwase, Yokohama (JP)

(73) Assignee: Kyocera Corporation, Kyoto (JP)

(*) Notice: Subject to any disclaimer, the term of this patent is extended or adjusted under 35 U.S.C. 154(b) by 438 days.

(21) Appl. No.: 12/294,874

(22) PCT Filed: Mar. 28, 2007

(86) PCT No.: PCT/JP2007/056737
§ 371 (c)(1),
(2), (4) Date: Mar. 24, 2010

(87) PCT Pub. No.: WO2007/116794
PCT Pub. Date: Oct. 18, 2007

(65) Prior Publication Data
US 2010/0178924 A1 Jul. 15, 2010

(30) Foreign Application Priority Data
Mar. 28, 2006 (JP) .................................. 2006-089136

(51) Int. Cl.
*H04W 36/00* (2009.01)
(52) U.S. Cl. ........ 455/438; 455/445; 455/443; 455/436; 370/335; 370/331
(58) Field of Classification Search .................. 455/438, 455/445, 443, 436; 370/335, 331
See application file for complete search history.

(56) References Cited

U.S. PATENT DOCUMENTS

| 5,740,531 A | 4/1998 | Okada |
| 6,845,238 B1 | 1/2005 | Muller |

FOREIGN PATENT DOCUMENTS

| JP | 06038267 A | 2/1994 |
| JP | 08126047 A | 5/1996 |
| JP | 11-046382 | 2/1999 |
| JP | 11069426 A | 3/1999 |
| JP | 2000-106531 | 4/2000 |
| JP | 2001-238251 | 8/2001 |
| JP | 2003-018641 | 1/2003 |
| JP | 2003509982 T | 3/2003 |
| JP | 2003-259414 | 9/2003 |
| JP | 2003-273792 | 9/2003 |
| JP | 2005006082 A | 1/2005 |

(Continued)

OTHER PUBLICATIONS

JP 11-069426 English translation.*

(Continued)

*Primary Examiner* — Jinsong Hu
*Assistant Examiner* — Jean Chang
(74) *Attorney, Agent, or Firm* — DLA Piper LLP (US)

(57) ABSTRACT

A base station 100 included in a first radio communication system includes: a monitor instruction unit 130 configured to instruct a mobile station 10 to monitor a reception power of an interference signal transmitted using a frequency assigned to a second radio communication system (frequency b) when the radio communication with the mobile station 10 performed using a frequency a is interrupted; and a handoff instruction unit 140 configured to instruct the mobile station 10 to switch the frequency used in the radio communication to a frequency e not interfered with by the interference signal, in accordance with the reception power monitored by the mobile station 10.

9 Claims, 11 Drawing Sheets

FOREIGN PATENT DOCUMENTS

WO          0120942 A1    3/2001

OTHER PUBLICATIONS

JP 2005-006082 English translation.*
JP 2003-273792 English translation.*
Chinese language office action and its English language translation for corresponding Chinese application 200780011325.8.

Japanese language office action dated Nov. 25, 2010 and its English language translation for corresponding Japanese application 2006089136.
Japanese language office action dated Feb. 24, 2011 and its English language translation for corresponding Japanese application 2006089136.

* cited by examiner

FIG. 5

| MOBILE STATION | LOCATED WITHIN AREA/ COMMUNICATING |
|---|---|
| MOBILE STATION a | × |
| MOBILE STATION b | ○ |
| MOBILE STATION c | ○ |
| MOBILE STATION d | × |
| ⋮ | ⋮ |
| TOTAL NUMBER | 100 | 30 |

INTERFERENCE WAVE MEASUREMENT REQUEST MESSAGE

| FIELD | LENGTH (bits) |
|---|---|
| USE_TIME | 1 |
| ACTION_TIME | 1 |
| IFSRM_SEQ | 2 |
| SEARCH_TYPE | 2 |
| SEARCH_PERIOD | 4 |
| SEARCH_MODE | 4 |
| MODE_SPECIFIC_LEN | 8 |
| Mode-specific-fields | 8 × MODE_SPECIFIC_LEN |
| NUM OF MES FREQ | 4 |
| BAND_CLASS | 5 |
| FREQ_CH | 10 |
| PWR_THRESH | 8 |

(b)

INTERFERENCE WAVE MEASUREMENT RESPONSE MESSAGE

| FIELD | LENGTH (bits) |
|---|---|
| SEARCH_MODE | 4 |
| LAST_SRCH_MSG | 1 |
| MODE_SPECIFIC_LEN | 8 |
| BAND_CLASS | 5 |
| FREQ_CH | 10 |
| SF_TOTAL_RX_PWR | 5 |
| IF_TOTAL_RX_PWR | 6 |

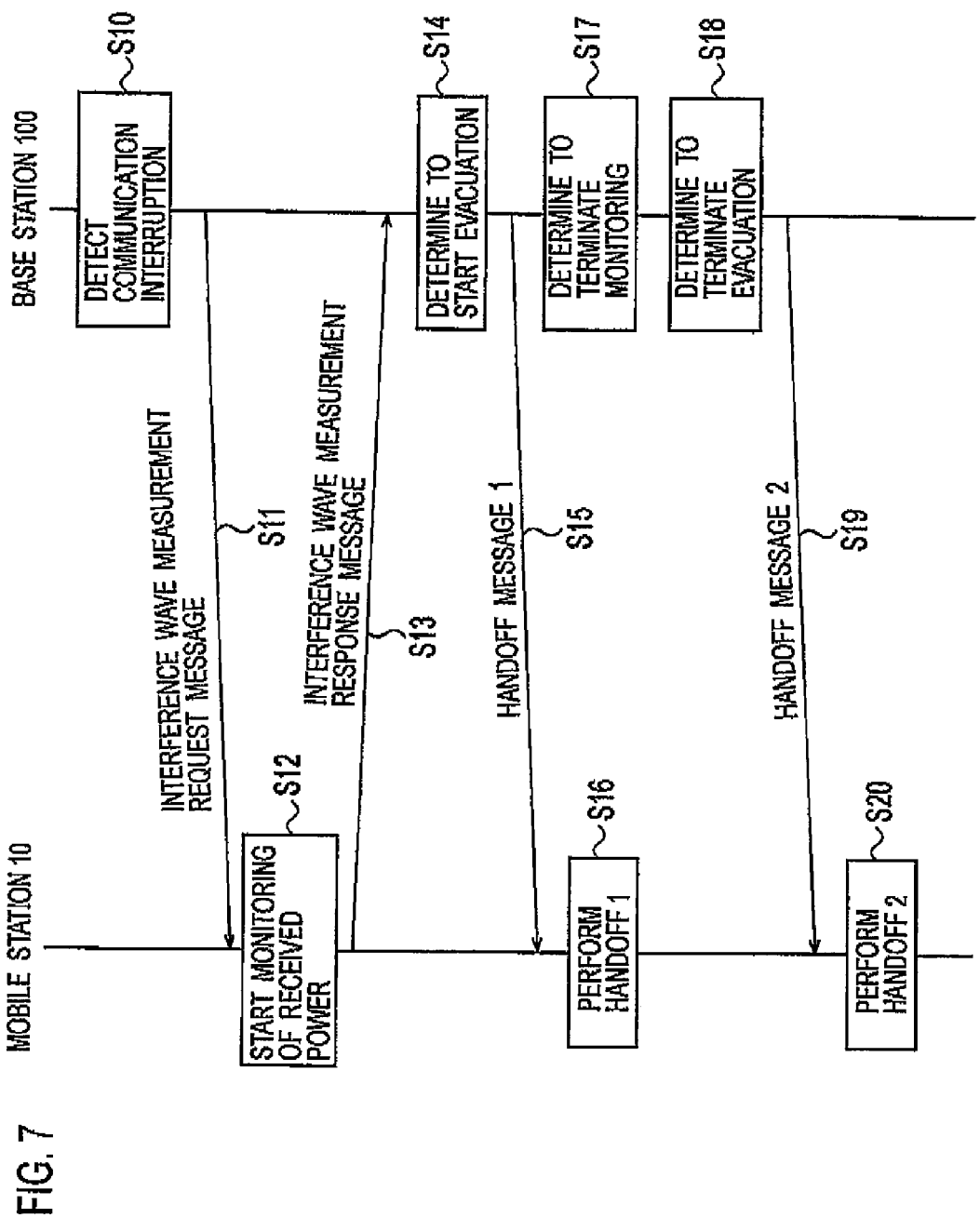

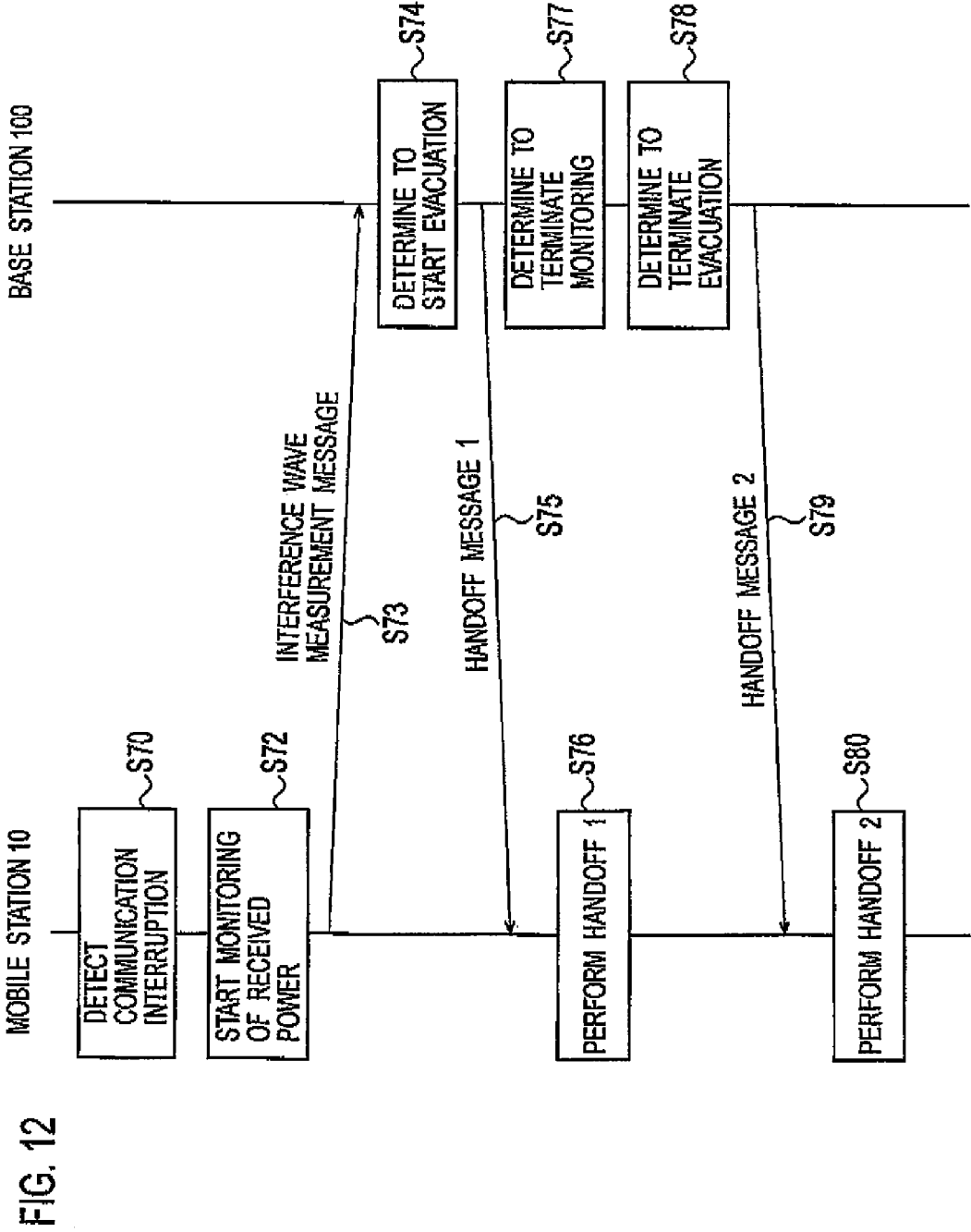

MOBILE STATION AND BASE STATION

TECHNICAL FIELD

The present invention relates to a mobile station capable of communicating with a first radio communication system, and to a base station included in the first radio communication system, in a communication system formed of the first radio communication system and a second radio communication system.

BACKGROUND ART

Multiple carriers exist at present, which provide radio communication systems employing different communication schemes (for example, cdma2000 and W-CDMA). A frequency bandwidth that can be assigned to the carriers is determined in advance, and each carrier is assigned a frequency used in the radio communication system from the limited frequency bandwidth.

Such a radio communication system is a radio communication system that provides real-time communication, and thus has a wide service area to avoid interruption of the real-time communication.

Since each radio communication system (a first radio communication system and a second radio communication system) has the wide service area as mentioned above, the service areas (regions) of the first radio communication system and the second radio communication system usually overlap each other.

Since the frequency used in each radio communication system (the first radio communication system and the second radio communication system) is assigned from the limited frequency bandwidth, it is assumed that the frequency used in the first radio communication system and the frequency used in the second radio communication system may overlap, or may be adjacent to each other.

In such a case, the communication performed between a second mobile station capable of communicating with the second radio communication system and a second base station included in the second radio communication system may interfere with a first mobile station capable of communicating with the first radio communication system.

When the second radio communication system, interferes with the first mobile station as mentioned above, the following method has been proposed as a method of avoiding interference from the second radio communication system.

Specifically, when a ratio of a reception power of a signal received from the first base station included in the first radio communication system and a reception power of a signal received from the second base station is not less than a predetermined threshold, the first mobile station performs handoff processing to switch the frequency used to communicate with the first base station to a frequency not interfered with by the second radio communication system (for example, Japanese Patent Application Publication No. 2003-18641 (claim 1, FIG. 7, and others)).

DISCLOSURE OF THE INVENTION

However, in the conventional art mentioned above, being unable to know the timing when the interference from the second radio communication system occurs, the first mobile station has to always measure (monitor) the reception power of the signal received from the second base station in order to effectively avoid the interference from the second radio communication system.

Therefore, such an attempt to effectively avoid the interference from the second radio communication system increases the power consumption of the first mobile station.

The present invention has been made to solve the problem mentioned above, and an object thereof is to provide a mobile station and a base station that are capable of effectively avoiding interference from a second radio communication system while suppressing increase in the power consumption of the mobile station included in a first radio communication system.

One aspect of the present invention is summarized in that in a communication system formed of a first radio communication system and a second radio communication system, a mobile station (mobile station 10) capable of communicating with the first radio communication system includes: a communication unit (communication unit 12) configured to perform radio communication with a base station (base station 100) of the first radio communication system; a monitor (monitor 13) configured to monitor a reception power of an interference signal that is transmitted using a frequency (for example, frequency b) assigned to the second radio communication system and that interferes with the radio communication performed using a first frequency, when the radio communication with the base station performed using the first frequency (for example, frequency a) is interrupted; a notification unit (notification unit) configured to notify the base station of the reception power monitored by the monitor; and a handoff processor (handoff processor 15) configured to perform a handoff processing to switch the frequency used in the radio communication to a second frequency (for example, frequency e) not interfered with by the interference signal in response to a handoff instruction (handoff message 1) transmitted by the base station having been notified of the reception power by the notification unit.

According to this aspect, when the radio communication with the base station performed using the first frequency is interrupted, the monitor monitors the reception power of the interference signal transmitted by using the frequency assigned to the second radio communication system.

Thus, when the radio communication is interrupted by being actually interfered with by the interference signal, the mobile station monitors the reception power of the interference signal. Therefore, it is possible to suppress increase in power consumption of the mobile station compared with a case where the reception power of the interference signal is always monitored.

Moreover, the mobile station performs the handoff processing to switch the frequency used in the radio communication to the second frequency not interfered with by the interference signal in response to the handoff instruction transmitted by the base station, in accordance with the reception power of the interference signal monitored when the radio communication is actually interfered with by the interference signal. Therefore, it is possible to effectively avoid interference from the second radio communication system.

One aspect of the present invention is summarized in that in the one aspect of the present invention mentioned above, the first frequency is a frequency used by the communication unit to receive a downlink signal, and the frequency used to transmit the interference signal is a frequency used by the second radio communication system to transmit an uplink signal.

One aspect of the present invention is summarized in that in a communication system formed of a first radio communication system and a second radio communication system, a base station (base station 100) included in the first radio communication system includes: a communication unit (communication unit 120) configured to perform radio communication with a mobile station (mobile station 10) capable of communicating with the first radio communication system; a monitor instruction unit (monitor instruction unit 130) configured to instruct the mobile station to monitor a reception power of an interference signal that is transmitted using a frequency (for example, frequency b) assigned to the second radio communication system, and that interferes with the radio communication performed using a first frequency, when the radio communication with the mobile station performed using the first frequency (for example, frequency a) is interrupted; and a handoff instruction unit (handoff instruction unit 140) configured to instruct the mobile station to switch the frequency used in the radio communication to a second frequency (for example, frequency e) not interfered with by the interference signal, in accordance with the reception power monitored by the mobile station.

According to the above aspect, when the radio communication with the mobile station performed using the first frequency is interrupted, the monitor instruction unit instructs the mobile station to monitor the reception power of the interference signal transmitted by using the frequency assigned to the second radio communication system.

In this way, the base station instructs the mobile station to monitor the reception power of the interference signal when the radio communication is interrupted by being actually interfered with by the interference signal. Therefore, it is possible to suppress increase in power consumption of the mobile station as compared with a case where the reception power of the interference signal is always monitored.

Moreover, in accordance with the reception power of the interference signal monitored by the mobile station when the radio communication is actually interfered with by the interference signal, the base station instructs the mobile station to switch the frequency used in the radio communication to the second frequency not interfered by the interference signal. Therefore, it is possible to effectively avoid interference from the second radio communication system.

One aspect of the present invention is summarized in that in the one aspect of the present invention mentioned above, the monitor instruction unit instructs the mobile station to monitor the reception power even after the handoff instruction unit gives an instruction to switch the frequency used in the radio communication to the second frequency, and in accordance with the reception power monitored by the mobile station, the handoff instruction unit instructs the mobile station to switch the frequency used in the radio communication to the first frequency.

One aspect of the present invention is summarized in that in the one aspect of the present invention mentioned above, when the handoff instruction unit gives an instruction to switch the frequency used in the radio communication to the first frequency, the monitor instruction unit instructs the mobile station to terminate the monitoring of the reception power.

One aspect of the present invention is summarized in that in the one aspect of the present invention mentioned above, the monitor instruction unit instructs the mobile station to terminate monitoring of the reception power when a certain period of time has passed after giving the instruction to monitor the reception power.

One aspect of the present invention is summarized in that in the one aspect of the present invention mentioned above, the handoff instruction unit instructs the mobile station to switch the frequency used in the radio communication to the first frequency when a certain period of time has passed after giving the instruction to switch the frequency used in the radio communication to the second frequency.

One aspect of the present invention is summarized in that in the one aspect of the present invention mentioned above, the handoff instruction unit instructs a plurality of mobile stations to switch the frequency used in the radio communication to the second frequency, and in accordance with the number of the remaining mobile stations that are still continuing the radio communication out of the plurality of mobile stations instructed to switch the frequency used in the radio communication to the second frequency, the monitor instruction unit instructs the plurality of mobile stations instructed to switch the frequency used in the radio communication to the second frequency to terminate monitoring of the reception power.

One aspect of the present invention is summarized in that in the one aspect of the present invention mentioned above, the handoff instruction unit instincts a plurality of mobile stations to switch the frequency used in the radio communication to the second frequency, and in accordance with the number of the mobile stations instructed to switch the frequency used in the radio communication to the second frequency, the monitor instruction unit instructs other mobile station included in the first radio communication system to monitor the reception power.

The present invention can provide a mobile station and a base station which are capable of suppressing increase in power consumption of the mobile station included in a first radio communication system, and of effectively avoiding interference from a second radio communication system.

BRIEF DESCRIPTION OF THE DRAWINGS

FIG. 5 is a drawing showing an example of information stored in a handoff management DB 150 according to the first embodiment of the present invention.

FIG. 6 is a drawing for describing messages according to the first embodiment of the present invention.

FIG. 7 is a sequence diagram showing operation of a first radio communication system according to the first embodiment of the present invention.

FIG. 12 is a sequence diagram showing operation of a first radio communication system according to a second embodiment of the present invention.

BEST MODE FOR CARRYING OUT THE INVENTION (First Embodiment)
(Configuration of Communication System)

Figure 1:
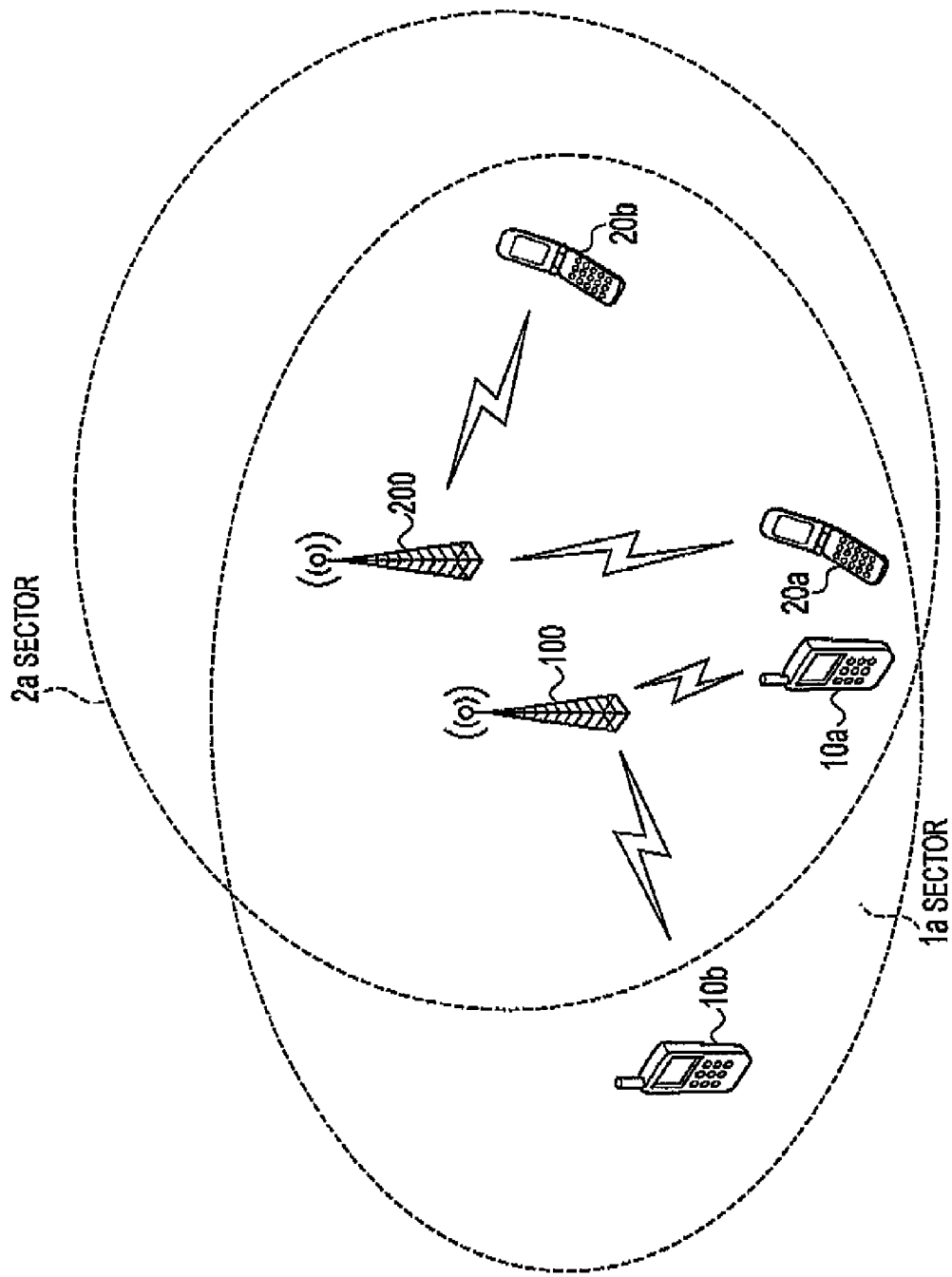
FIG. 1 is a drawing showing a configuration of a communication system according to a first embodiment of the present invention.

Hereinafter, a configuration of a communication system according to a first embodiment of the present invention will be described with reference to the drawing. FIG. 1 is a drawing showing the configuration of the communication system according to the first embodiment of the present invention. In the first embodiment, the communication system is formed of a first radio communication system and a second radio communication system.

Here, communication schemes (for example, cdma-2000 and W-CDMA) used in the first radio communication system and the second radio communication system are different, and a carrier that provides the first radio communication system and a carrier that provides the second radio communication system are also different.

As shown in FIG. 1, the communication system has multiple mobile stations 10 (a mobile station 10a and a mobile station 10b), multiple mobile stations 20 (a mobile station 20a and a mobile station 20b), a base station 100, and a base station 200. Since the mobile station 10a and the mobile station 10b have a similar configuration, they are generically referred to as the mobile station 10 when needed. Similarly, since the mobile station 20a and the mobile station 20b have a similar configuration, they are generically referred to as the mobile station 20 when needed.

Here, the mobile station 10 and the base station 100 are used in the first radio communication system, while the mobile station 20 and the base station 200 are used in the second radio communication system. A sector 1a is an area that a radio wave of the base station 100 reaches, and is a service area where service of the first radio communication system is provided. On the other hand, a sector 2a is an area that a radio wave of the base station 200 reaches, and is a service area where service of the second radio communication system is provided.

The sector 1a where the service is provided from the first radio communication system overlaps the sector 2a where the service is provided from the second radio communication system. The area where the sector 1a and the sector 2a overlap is referred to as an overlap area. Moreover, in the first embodiment, the frequency used between the mobile station 10 and the base station 100 is adjacent to the frequency used between the mobile station 20 and the base station 200 (see FIG. 2).

Therefore, the radio communication performed between the base station 200 and the mobile station 20a located within the overlap area interferes with the radio communication performed between the base station 100 and the mobile station 10a located within the overlap area. Specifically, an uplink signal transmitted to the base station 200 by the mobile station 20a and a downlink signal transmitted to the mobile station 20a by the base station 200 interfere with the radio communication performed between the mobile station 10a and the base station 100.

Particularly, when the mobile station 10a and the mobile station 20a are close to each other, the uplink signal transmitted to the base station 200 by the mobile station 20a largely interferes with the downlink signal received by the mobile station 10a from the base station 100.

(Assignment of Frequency)

Figure 2:
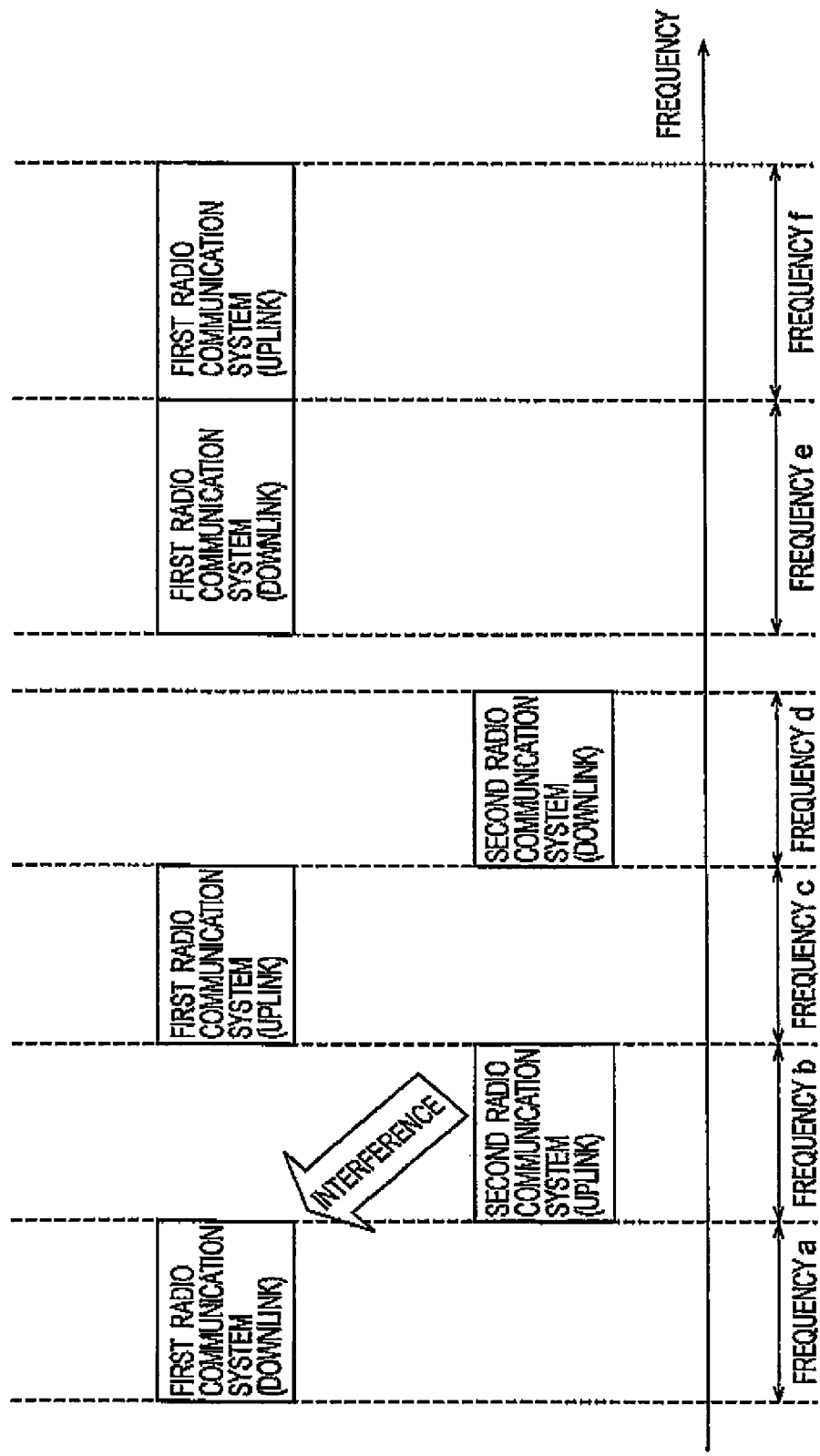
FIG. 2 is a drawing showing assignment of a frequency according to the first embodiment of the present invention.

Hereinafter, assignment of a frequency according to the first embodiment of the present invention will be described with reference to the drawing. FIG. 2 is a drawing showing the assignment of a frequency according to the first embodiment of the present invention.

As shown in FIG. 2, a frequency a, a frequency c, a frequency e, and a frequency f are assigned to the first radio communication system. Specifically, the frequency a and the frequency e are each the frequency used when transmitting the downlink signal from the base station 100 to the mobile station 10. The frequency c and the frequency f are the frequency used when transmitting the uplink signal from the mobile station 10 to the base station 100. For example, the frequency a and the frequency c are the frequency mainly used for voice communication. The frequency e and the frequency f are the frequency mainly used for data communication.

On the other hand, a frequency b and a frequency d are assigned to the second radio communication system. Specifically, the frequency b is the frequency used when transmitting the uplink signal from the mobile station 20 to the base station 200. The frequency d is the frequency used when transmitting the downlink signal from the base station 200 to the mobile station 20.

In this way, the frequency a assigned to the first radio communication system and the frequency b assigned to the second radio communication system are adjacent to each other. In such a case, when the mobile station 10 receives a signal transmitted from the base station 100 by using the frequency a, a signal transmitted from the mobile station 20 to the base station 200 by using the frequency b interferes with the signal received by the mobile station 10 by using the frequency a. Hence, such a situation may occur that the mobile station 10 cannot receive the signal transmitted from the base station 100 by using the frequency a.

Hereinafter, description will be given by taking an example where a signal transmitted from the mobile station 20 by using the frequency b interferes with a signal transmitted from the base station 100 to the mobile station 10 by using the frequency a. The frequency b is a frequency used to transmit a signal (hereinafter, referred to as interference signal) that interferes with the radio communication performed between the mobile station 10 and the base station 100. Accordingly, note that the frequency b will be referred to as an interference frequency when needed.

(Configuration of Mobile Station)

Figure 3:
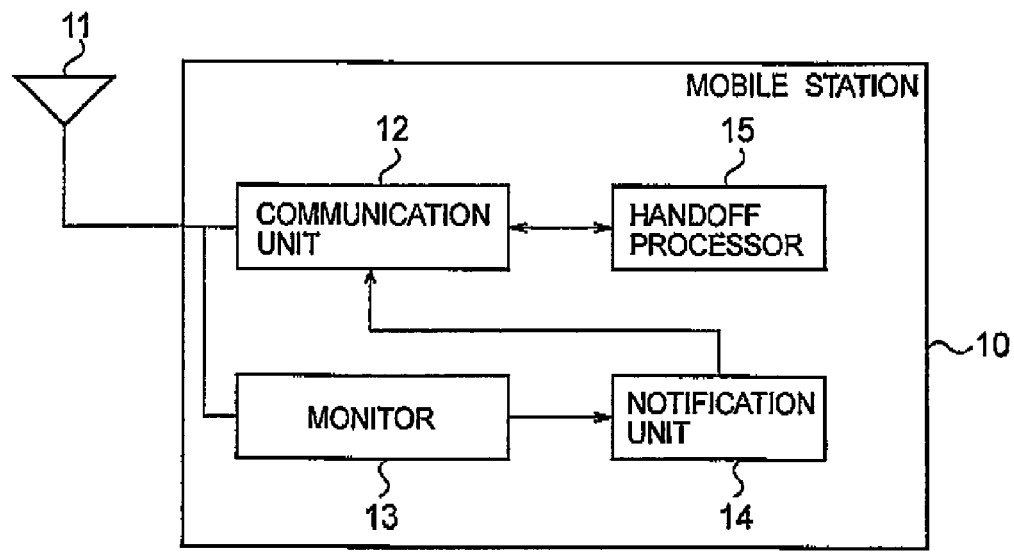
FIG. 3 is a block diagram showing a configuration of a mobile station 10 according to the first embodiment of the present invention.

Hereinafter, a configuration of the mobile station according to the first embodiment of the present invention will be described with reference to the drawing. FIG. 3 is a block diagram, showing the configuration of the mobile station 10 according to the first embodiment of the present invention. Hereinafter, description is given by taking an example where a downlink signal transmitted by the base station 100 to the mobile station 10 is transmitted mainly by using the frequency a.

As shown in FIG. 3, the mobile station 10 has an antenna 11, a communication unit 12, a monitor 13, an informing unit 14, and a handoff processor 15.

The antenna 11 receives a signal transmitted from the base station 100 by using the frequency a and the frequency e, a signal transmitted from the base station 200 by using the frequency d, and a signal transmitted from the mobile station 20 by using the frequency b. The antenna 11 also transmits a signal to the base station 100 by using the frequency c and the frequency f.

The communication unit 12 performs the radio communication with the base station 100 by using the antenna 11. Specifically, the communication unit 12 has a function to perform spreading and despreading, a function to perform modulation and demodulation, a function to perform analog to digital conversion, a function to perform digital to analog conversion, and the like. The communication unit 12 transmits a signal to the base station 100 through the antenna 11 by using the frequency assigned to the first radio communication system (frequency c and frequency f). Moreover, the communication unit 12 receives a signal from the base station 100 through the antenna 11 by using the frequency assigned to the first radio communication system (frequency a and frequency e).

The monitor 13 monitors a reception power of the interference signal interfering with the radio communication performed between the mobile station 10 and the base station 100, in response to an interference wave measurement request message received from the base station 100. Details of the interference wave measurement request message will be described later (see FIG. 6(a)).

The interference signal mentioned here is a signal transmitted using the interference frequency being a frequency assigned to the second radio communication system. For example, when the radio communication performed between the mobile station 10 and the base station 100 is the downlink radio communication performed by using the frequency a, the interference signal is an uplink signal transmitted from the mobile station 20 by using the interference frequency (the frequency b), as mentioned above.

The notification unit 14 notifies the base station 100 of the reception power of the interference signal monitored by the monitor 13. Specifically, the notification unit 14 generates an interference wave measurement response message including the reception power of the interference signal, and inputs the interference wave measurement response message into the communication unit 12.

Then, the communication unit 12 transmits the inputted interference wave measurement response message to the base station 100. Details of the interference wave measurement response message will be described later (see FIG. 6(b)).

The handoff processor 15 performs a handoff processing to switch the frequency used in the radio communication performed by the communication unit 12 in response to a handoff message instructing to switch the frequency used in the radio communication performed by the communication unit 12. The base station 100 transmits this handoff message to the mobile station 10.

(Configuration of Base Station)

Figure 4:
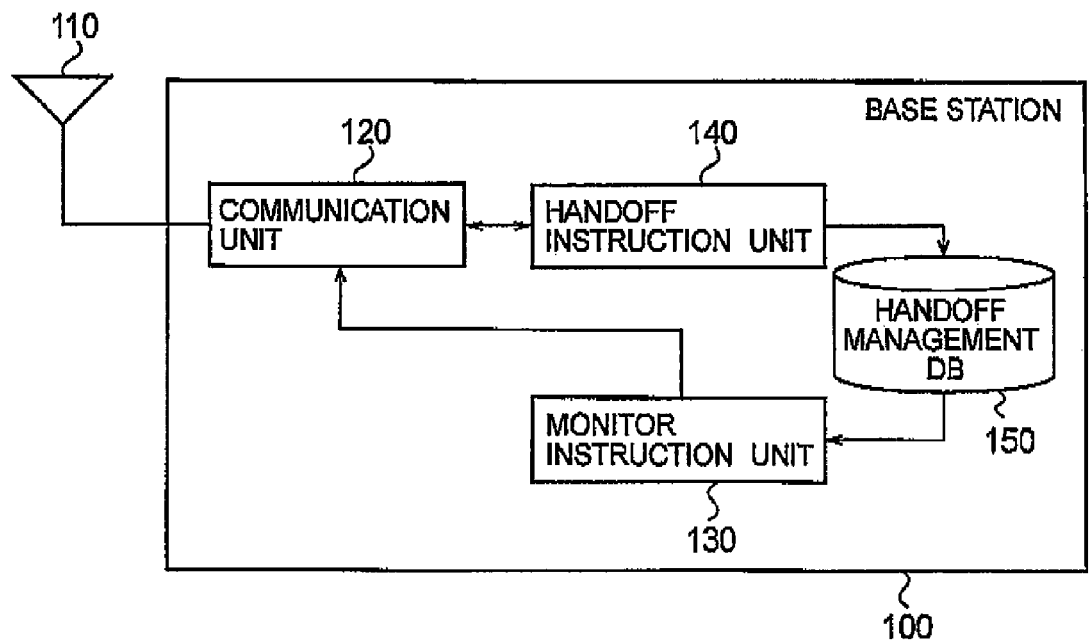
FIG. 4 is a block diagram showing a configuration of a base station 100 according to the first embodiment of the present invention.

Hereinafter, a configuration of the base station according to the first embodiment of the present invention will be described with reference to the drawing. FIG. 4 is a block diagram showing the configuration of the base station 100 according to the first embodiment of the present invention.

As shown in FIG. 4, the base station 100 has an antenna 110, a communication unit 120, a monitor instruction unit 130, a handoff instruction unit 140, and a handoff management DB 150.

The antenna 110 receives a signal transmitted from the mobile station 10 by using the frequency c and the frequency f, a signal transmitted from the base station 200 by using the frequency d, and a signal transmitted from the mobile station 20 by using the frequency b. The antenna 110 also transmits a signal to the mobile station 10 by using the frequency a and the frequency e.

The communication unit 120 performs the radio communication with the mobile station 10 by using the antenna 110. Specifically, the communication unit 120 has a function to perform spreading and despreading, a function to perform modulation and demodulation, a function to perform analog to digital conversion, a function to perform digital to analog conversion, and the like. The communication unit 120 also transmits a signal to the mobile station 10 through the antenna 110 by using the frequency assigned to the first radio communication system (frequency a and frequency e). Moreover, the communication unit 120 receives a signal from the mobile station 10 through the antenna 110 by using the frequency assigned to the first radio communication system (frequency c and frequency f).

The monitor instruction unit 130 instructs the mobile station 10 to monitor the reception power of the interference signal. Specifically, the monitor instruction unit 130 generates the interference wave measurement request message instructing to monitor the reception power of the interference signal, and inputs the generated interference wave measurement request message into the communication unit 120.

The communication unit 120 transmits the inputted interference wave measurement request message to the mobile station 10. Details of the interference wave measurement request message will be described later (see FIG. 6(a)).

The monitor instruction unit 130 instructs the mobile station 10 to monitor the reception power of the interference signal when the radio communication performed between the mobile station 10 and the base station 100 is interrupted. In the first embodiment, "interruption of the radio communication" means a state where the mobile station 10 and the base station 100 having been temporality unable to be synchronized with each other at a physical layer go back to a state of being synchronized with each other at the physical layer within a certain period of time since a session is not disconnected at a layer of higher order than the physical layer.

Moreover, when the number of the mobile stations 10 instructed to switch the frequency used in the radio communication to the frequency (frequency e) not interfered with by the interference signal is larger than a predetermined determination value, the monitor instruction unit 130 instructs other mobile station 10 to monitor the reception power of the interference signal, the other mobile station 10 performing the radio communication by using the frequency that may be interfered with by the interference signal (frequency a). The predetermined determination value is, for example, 10% of the total traffic intensity of the sector 1a managed by the base station 100.

On the other hand, when the reception power of the interference signal monitored by the mobile station 10 becomes not more than a predetermined threshold (Th2), the monitor instruction unit 130 instructs the mobile station 10 to terminate the monitoring of the reception power of the interference signal.

Moreover, when, out of the mobile stations 10 instructed to switch the frequency used in the radio communication to the frequency not interfered with by the interference signal (frequency e), the number of the remaining mobile stations 10 that are still continuing the radio communication with the base station 100 becomes not more than a fixed number (or, not more than a fixed proportion), the monitor instruction unit 130 instructs the mobile stations 10, having switched the frequency used in the radio communication to the frequency not interfered with by the interference signal (frequency e), to terminate the monitoring of the reception power of the interference signal.

Here, the mobile stations 10 instructed to switch the frequency used in the radio communication to the frequency not interfered with by the interference signal (frequency e) are managed by the handoff management DB 150 described later. The monitor instruction unit 130 gives an instruction to terminate the monitoring of the reception power of the interference signal by referring to the handoff management DB 150.

The handoff instruction unit 140 instructs the mobile station 10 to switch the frequency used in the radio communication to the frequency not interfered with by the interference signal (frequency e) when the reception power of the interference signal monitored by the mobile station 10 is not less than a predetermined threshold (Th1). Specifically, when the reception power of the interference signal is not less than the predetermined threshold (Th1), the handoff instruction unit 140 generates a handoff message 1 for switching the frequency used in the radio communication to the frequency e, and then inputs the generated handoff message 1 into the communication unit 120. The communication unit 120 transmits the inputted handoff message 1 to the mobile station 10.

Moreover, after passage of a certain period of time since the handoff instruction unit 140 has instructed the mobile station 10 to switch the frequency used in the radio communication to the frequency not interfered with by the interference signal, the handoff instruction unit 140 instructs the mobile station 10 to switch the frequency used in the radio communication back to the original frequency (frequency a). Specifically, after passage of the certain period of time since the handoff instruction unit 140 has inputted the handoff message 1 into the communication unit 120, the handoff instruction unit 140 generates a handoff message 2 for switching the frequency used in the radio communication back to the frequency a, and then inputs the generated handoff message 2 to the communication unit 120, The communication unit 120 transmits the inputted handoff message 2 to the mobile station 10.

Furthermore, when the reception power of the interference signal monitored by the mobile station 10 is hot more than the predetermined threshold (Th2), the handoff instruction unit 140 instructs the mobile station 10 to switch the frequency used in the radio communication back to the original frequency (frequency a). Specifically, when the reception power of the interference signal is not more than the predetermined threshold (Th2), the handoff instruction unit 140 generates the handoff message 2 for switching the frequency used in the radio communication back to the frequency a, and then inputs the generated handoff message 2 into the communication unit 120. The communication unit 120 then transmits the inputted handoff message 2 to the mobile station 10.

In addition, the predetermined threshold (Th2) may not be the same value as the predetermined threshold (Th1) mentioned above. For example, the predetermined threshold (Th2) may be a value smaller than the predetermined threshold (Th1) mentioned above.

The handoff management DB 150 is a database that manages the mobile station 10 instructed to switch the frequency used in the radio communication from the frequency interfered with by the interference signal (frequency a) to the frequency not interfered with by the interference signal (frequency e).

Specifically, the handoff management DB 150 stores information shown in FIG. 5. FIG. 5 is a drawing showing an example of the information stored in the handoff management DB 150 according to the first embodiment of the present invention.

As shown in FIG. 5, the handoff management DB 150 stores the mobile stations 10 instructed to switch the frequency used in the radio communication from the frequency a to the frequency e, each in association with the information on whether the radio communication performed between the mobile station 10 and the base station 100 is continuing. In FIG. 5, a symbol "o" indicates that the radio communication performed between the mobile station 10 and the base station 100 is continuing. On the other hand, a symbol "x" indicates that the radio communication performed between the mobile station 10 and the base station 100 is not continuing.

Here, as the case where the radio communication performed between the mobile station 10 and the base station 100 is not continuing, a case where the mobile station 10 is no longer located within the sector 1a managed by the base station 100, a case where the radio communication performed by the mobile station 10 is terminated, or other cases can be considered.

(Kind of Messages)

Hereinafter, messages according to the first embodiment of the present invention will be described with reference to the drawing. FIG. 6 is a drawing for describing the messages according to the first embodiment of the present invention.

As shown in FIG. 6(a), the interference wave measurement request message includes "USE_TIME," "ACTION_TIME," "IFSRM_SEQ," "SEARCH_TYPE," "SEARCH_PERIOD," "SEARCH_MODE," "MODE_SPECIFIC_LEN," "Mode_specific_fields," "NUM_OF_MES_FREQ," "BAND_CLASS," "FREQ_CH," and "PWR_THRESH."

"USE_TIME" is a bit string that shows whether to give an instruction to measure the reception power of the interference signal. When giving an instruction to measure the reception power of the interference signal, the bit string is set to "1."

"ACTION_TIME" is a bit string that shows whether to give an instruction to measure the reception power of the interference signal. When giving an instruction to measure the reception power of the interference signal, the bit string is set to "1."

"IFSRM_SEQ" is a bit string that shows a sequence number of the interference wave measurement request message.

"SEARCH_TYPE" is a bit string that specifies a method of monitoring the reception power of the interference signal. For example, the bit string "00" shows that monitoring of the reception power of the interference signal is not instructed, and the bit string "01" shows that monitoring the reception power of the interference signal once is instructed. The bit string "10" shows that monitoring the reception power of the interference signal twice is instructed. The bit string "11" shows that monitoring the reception power of the interference signal 3 times is instructed.

"SEARCH_PERIOD" is a bit staring that specifies time period to monitor the reception power of the interference signal. The time period to monitor the reception power of the interference signal is, for example, in 5 ms units.

"SEARCH_MODE" is a bit string that specifies a communication scheme of the radio communication system that transmits the interference signal. For example, a bit string "0000" shows an instruction is given to monitor the reception power of the interference power from the radio communication system employing CDMA as the communication scheme. A bit string "0001" shows that an instruction is given to monitor the reception power of the interference power from the radio communication system employing DS-CDMA as the communication scheme. A bit string "0002" shows that monitoring of the reception power of the interference power is instructed irrespective of the communication scheme employed.

"MODE_SPECIFIC_LEN" is a bit string that shows a message length of the interference wave measurement request message. The message length of the interference wave measurement request message is different in each "SEARCH_MODE" mentioned above.

"NUM_OF_MES_FREQ" is a bit string that specifies the number of frequencies at which the reception power of the interference signal is monitored.

"BAND_CLASS" is a bit string that specifies a bandwidth of the frequency at which the reception power of the interference signal is monitored.

"FREQ_CH" is a bit string that specifies a number of a channel to monitor the reception power of the interference signal.

"PWR_THRESH" is a bit string that specifies a threshold for determining whether or not to report the reception power of the interference signal.

As shown in FIG. 6(b), the interference wave measurement response message includes "SEARCH_MODE," "LAST_

SRCH_MSG," "MODE_SPECIFIC_LEN," "BAND_CLASS," "FREQ_CH," "SF_TOTAL_RX_PWR," and "IF_TOTAL_RX_PWR."

"SEARCH_MODE" is a bit string that specifies the communication scheme of the radio communication system that transmits the interference signal. For example, the bit string "0000" shows the monitoring has been performed on the reception power of the interference power from the radio communication system employing CDMA as the communication scheme. A bit string "0001" shows that the monitoring has been performed on the reception power of the interference power from the radio communication system employing DS-CDMA as the communication scheme. A bit string "0002" shows that the reception power of the interference power has been monitored irrespective of the communication scheme employed.

"LAST_SRCH_MSG" is a bit string that shows the sequence number of the latest interference wave measurement response message transmitted right before transmitting the current interference wave measurement response message.

"MODE_SPECIFIC_LEN" is a bit string that shows a message length of the interference wave measurement response message. The message length of the interference wave measurement response message is different in each "SEARCH_MODE" mentioned above.

"BAND_CLASS" is a bit string that specifies a bandwidth of the frequency at which the reception power of the interference signal has been monitored.

"FREQ_CH" is a bit string that specifies a number of the channel that has monitored the reception power of the interference signal.

"SF_TOTAL_RX_PWR" is a bit string that shows the total of the reception power of the signals received in the radio communication performed at present.

"IF_TOTAL_RX_PWR" is a bit string that shows the total of the reception power of the interference signal.

Needless to say, the interference wave measurement request message and the interference wave measurement response message are not limited to the message format mentioned above. The interference wave measurement request message may be a message that at least gives an instruction to monitor the reception power of the interference signal, and the interference wave measurement response message may be a message that at least includes the reception power of the interference signal.

(Operation of First Radio Communication System)

Hereinafter, operation of the first radio communication system according to the first embodiment of the present invention will be described with reference to the drawing. FIG. 7 is a sequence diagram showing the operation of the first radio communication system according to the first embodiment of the present invention. FIG. 7 shows an outline of the operation of the first radio communication system.

Hereinafter, description will be given by taking an example described above where a signal transmitted from the mobile station 20 by using the frequency b interferes with a signal transmitted from the base station 100 to the mobile station 10 by using the frequency a.

As shown in FIG. 7, at Step 10, the base station 100 detects interruption of the radio communication performed between the mobile station 10 and the base station 100.

At Step 11, the base station 100 transmits an interference wave measurement request message to the mobile station 10. The interference wave measurement request message is, as mentioned above, a message that instructs the mobile station 10 to monitor the reception power of the interference signal.

In the first embodiment, the base station 100 periodically transmits the interference wave measurement request message until determining to terminate the monitoring of the reception power of the interference signal. Therefore, instructing to terminate the monitoring of the reception power of the interference signal is synonymous with completing the transmission of the interference wave measurement request message.

At Step 12, the mobile station 10 starts monitoring the reception power of the interference signal. Specifically, the mobile station 10 starts the monitoring of the reception power of the interference signal transmitted by using the interference frequency (frequency b).

At Step 13, the mobile station 10 transmits an interference wave measurement response message to the base station 100. The interference wave measurement response message is, as mentioned above, a message that includes the reception power of the interference signal.

At Step 14, the base station 100 determines whether to instruct the mobile station 10 to switch the frequency used in the radio communication performed between the mobile station 10 and the base station 100 to the frequency not interfered with by the interference signal (frequency e). For example, the base station 100 determines whether the reception power of the interference signal included in the interference wave measurement response message is not less than the predetermined threshold (Th1). In FIG. 7, description is made based on a premise that the reception power of the interference signal is not less than the predetermined threshold (Th1).

At Step 15, the base station 100 transmits a handoff message 1 to the mobile station 10, the handoff message 1 giving an instruction to perform switching of the frequency used in the radio communication performed between the mobile station 10 and the base station 100. The handoff message 1 is a message that gives an instruction to switch the frequency used in the radio communication to the frequency not interfered with by the interference signal (frequency e).

At Step 16, the mobile station 10 performs the handoff processing (handoff 1) to carry out switching of the frequency used in the radio communication performed between the mobile station 10 and the base station 100. The handoff 1 is processing to switch the frequency used in the radio communication to the frequency not interfered with by the interference signal (frequency e).

At Step 17, the base station 100 determines whether to instruct the mobile station 10 to terminate the monitoring of the reception power of the interference signal. For example, the base station 100 determines whether the reception power of the interference signal included in the interference wave measurement response message is not more than the predetermined threshold (Th2).

At Step 18, the base station 100 determines whether to instruct the mobile station 10 to switch the frequency used in the radio communication performed between the mobile station 10 and the base station 100 back to the original frequency that may be interfered with by the interference signal (frequency a). For example, the base station 100 determines whether the reception power of the interference signal included in the interference wave measurement response message is not more than the predetermined threshold (Th2). In FIG. 7, description is made based on a premise that the reception power of the interference signal is not more than the predetermined threshold (Th2).

At Step 19, the base station 100 transmits a handoff message 2 that instructs the mobile station 10 to perform switching of the frequency used in the radio communication performed between the mobile station 10 and the base station

100. The handoff message 2 is a message that gives an instruction to switch the frequency used in the radio communication back to the original frequency that may be interfered with by the interference signal (frequency a).

At Step 20, the mobile station 10 performs the handoff processing (handoff 2) to carry out switching of the frequency used in the radio communication performed between the mobile station 10 and the base station 100. The handoff 2 is processing to switch the frequency used in the radio communication back to the original frequency that may be interfered with by the interference signal (frequency a).

(Operation of Base Station)

Hereinafter, operation of the base station according to the first embodiment of the present invention will be described with reference to the drawings. FIGS. 8 to 11 are flow charts showing the operation of the base station 100 according to the first embodiment of the present invention.

Figure 8:
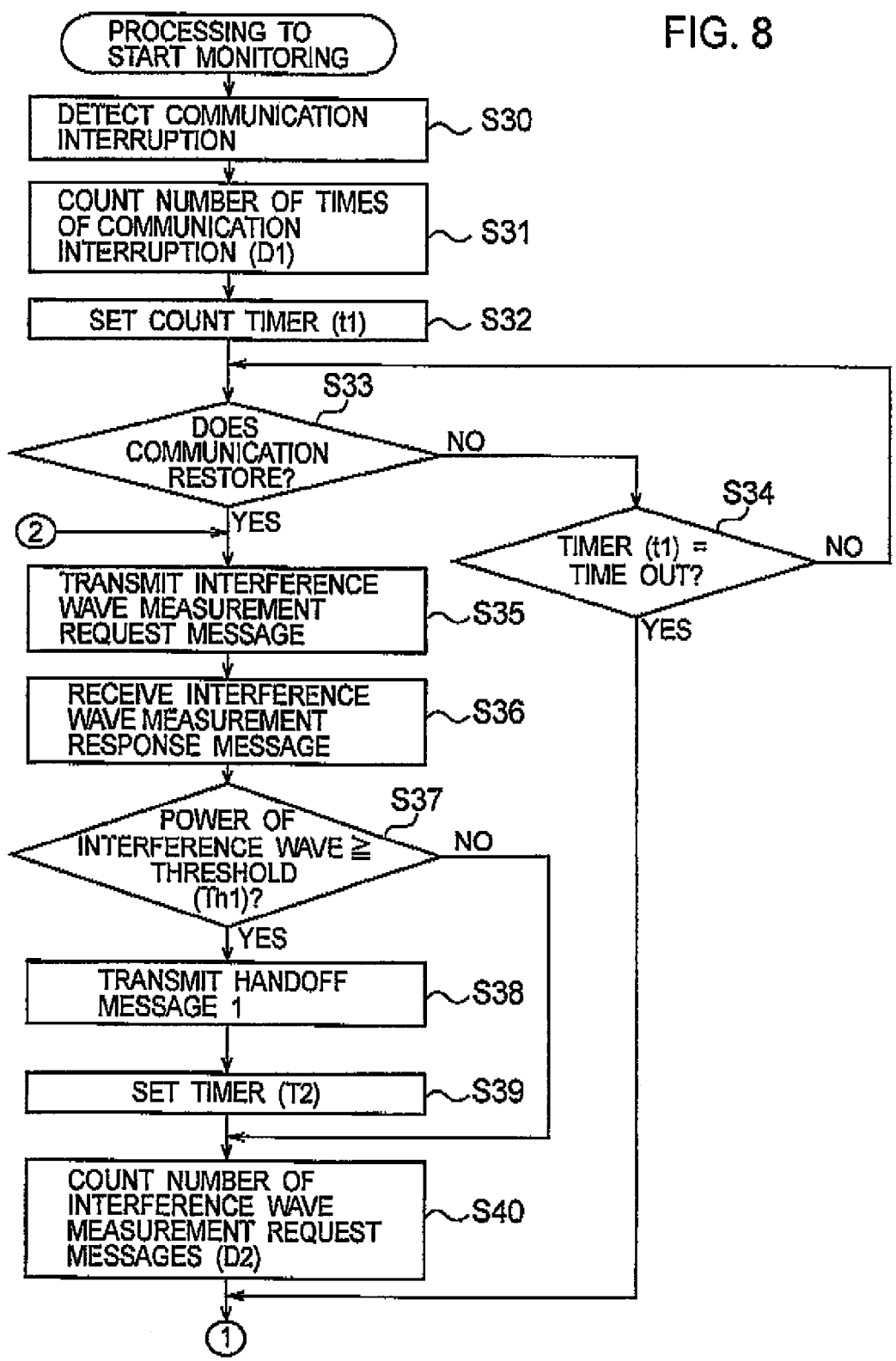
FIG. 8 is a flow chart showing operation of the base station 100 according to the first embodiment of the present invention (part 1).

First, processing to give an instruction to start monitoring the reception power (monitoring start processing) will be described. As shown in FIG. 8, at Step 30, the base station 100 detects that the radio communication performed between the mobile station 10 and the base station 100 has been interrupted (communication interruption). The communication interruption is a state where a session is not disconnected at a layer of higher order than the physical layer although the mobile station 10 and the base station 100 are temporarily unable to be synchronized with each other at the physical layer.

At Step 31, the base station 100 counts up the number of times of communication interruption. The number of times of communication interruption is referred to as D1 below.

At Step 32, the base station 100 sets a predetermined latency time in a timer (t1). The timer (t1) is a timer that measures time passed since the mobile station 10 and the base station 100 have been temporarily unable to be synchronized with each other at the physical layer. The timer (t1) is provided for each mobile station 10.

At Step 33, the base station 100 determines whether the radio communication performed between the mobile station 10 and the base station 100 is restored. When the radio communication is restored, the base station 100 goes to processing of Step 35. When the radio communication is not restored, the base station 100 goes to processing of Step 34.

Restoration of the radio communication is a state where the mobile station 10 and the base station 100 have gone back to a state of being synchronized with each other at the physical layer, from the state where the session is not disconnected only at a layer of higher order than the physical layer turns.

At Step 34, the base station 100 determines whether the timer (t1) has timed out. When the timer (t1) has timed out, the base station 100 goes to processing of Step 41. When the timer (t1) has not timed out, the base station 100 returns to the processing of Step 33.

At Step 35, the base station 100 transmits an interference wave measurement request message to the mobile station 10.

At Step 36, the base station 100 receives an interference wave measurement response message from the mobile station 10.

At Step 37, the base station 100 determines whether the reception power of the interference signal included in the interference wave measurement response message is not less than the predetermined threshold (Th1). When the reception power of the interference signal is not less than the predetermined threshold (Th1), the base station 100 goes to processing of Step 38. When the reception power of the interference signal is less than predetermined threshold (Th1), the base station 100 goes to processing of Step 40.

At Step 38, the base station 100 transmits the handoff message 1 to the mobile station 10. The handoff message 1 is, as mentioned above, a message that gives an instruction to switch the frequency used in the radio communication to the frequency not interfered with by the interference signal (frequency e).

At Step 39, the base station 100 sets a predetermined latency time in a timer (t2). The timer (t2) is a timer that measures time passed since the frequency used in the radio communication has been switched to the frequency not interfered with by the interference signal (frequency e). The timer (t2) is provided for each mobile station 10.

At Step 40, the base station 100 counts up the number of times that the base station 10 has transmitted the interference wave measurement request message to the mobile station 10. Hereinafter, the number of times that the base station 10 has transmitted the interference wave measurement request message to the mobile station 10 is referred to as D2.

Figure 9:
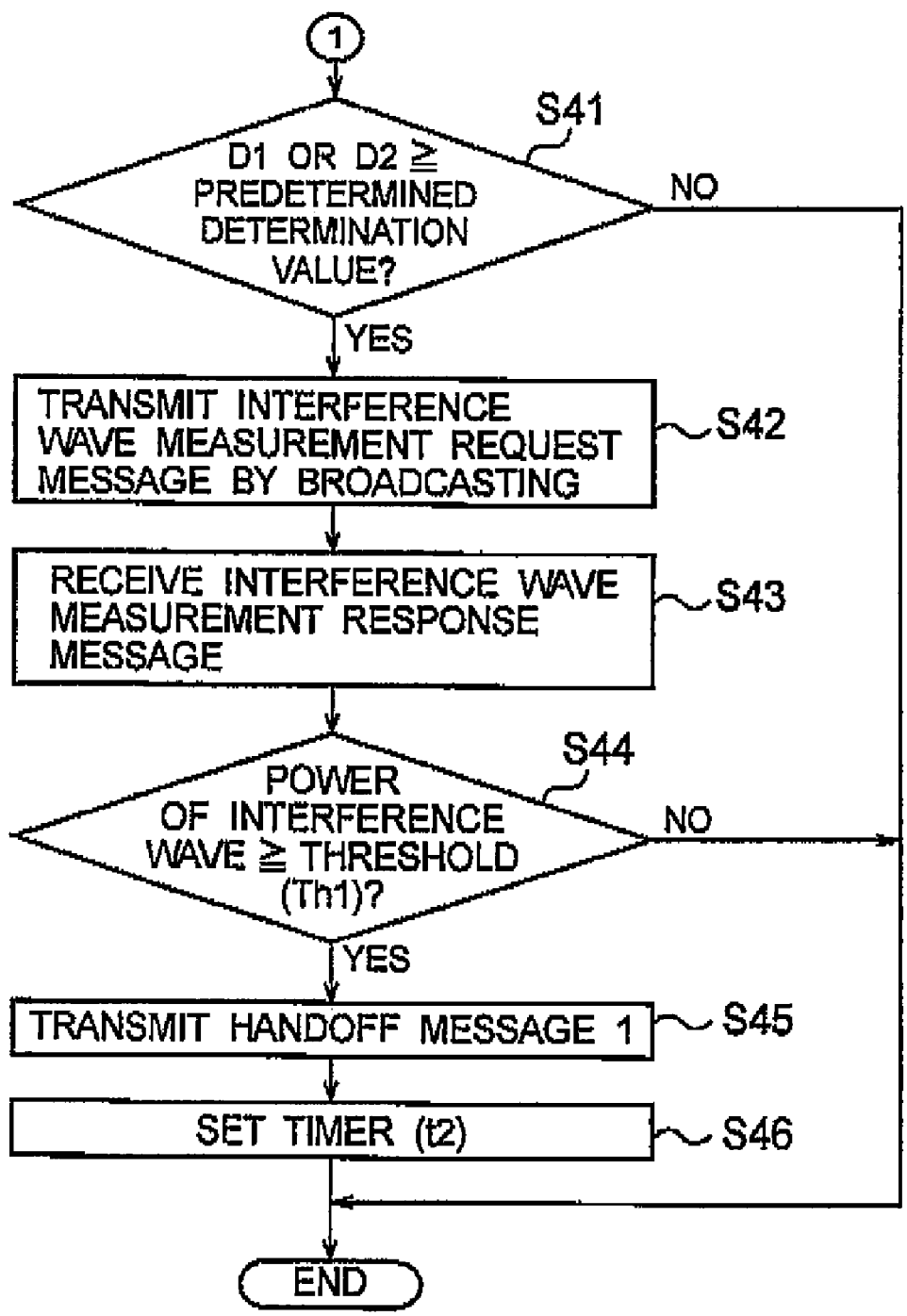
FIG. 9 is a flow chart showing the operation of the base station 100 according to the first embodiment of the present invention (part 2).

Subsequently, as shown in FIG. 9, the base station 100 determines, at Step 41, whether the D1 or D2 mentioned above is not less than a predetermined, determination value. When the D1 or the D2 is not less than the predetermined determination value, the base station 100 goes to processing of Step 42. When the D1 or the D2 is less than the predetermined determination value, the base station 100 terminates the monitoring start processing.

A value compared with the predetermined determination may be either the D1 or the D2. The predetermined determination value is, for example, 10% of the total traffic intensity of the sector 1a managed by the base station 100.

At Step 42, the base station 100 transmits the interference measurement request message to other mobile station 10 that performs the radio communication by using the frequency that may be interfered with by the interference signal (frequency a). The base station 100 may transmit the interference wave measurement request message by broadcasting, or may transmit the interference wave measurement request message to the mobile stations 10 that are currently continuing the radio communication with the base station 100 by multicasting.

At Step 43, the base station 100 receives an interference wave measurement response message from the mobile station 10.

At Step 44, the base station 100 determines whether the reception power of the interference signal included in the interference wave measurement response message is not less than the predetermined threshold (Th1). When the reception power of the interference signal is not less than the predetermined threshold (Th1), the base station 100 goes to processing of Step 45. When the reception power of the interference signal is less than the predetermined threshold (Th1), the base station 100 terminates the monitoring start processing.

At Step 45, the base station 100 transmits the handoff message 1 to the mobile station 10 that has transmitted the interference wave measurement response message, the reception power of the interference signal included in which is not less than the predetermined threshold (Th1).

At Step 46, the base station 100 sets the predetermined latency time in the timer (t2) in the same manner as in Step 39.

Figure 10:
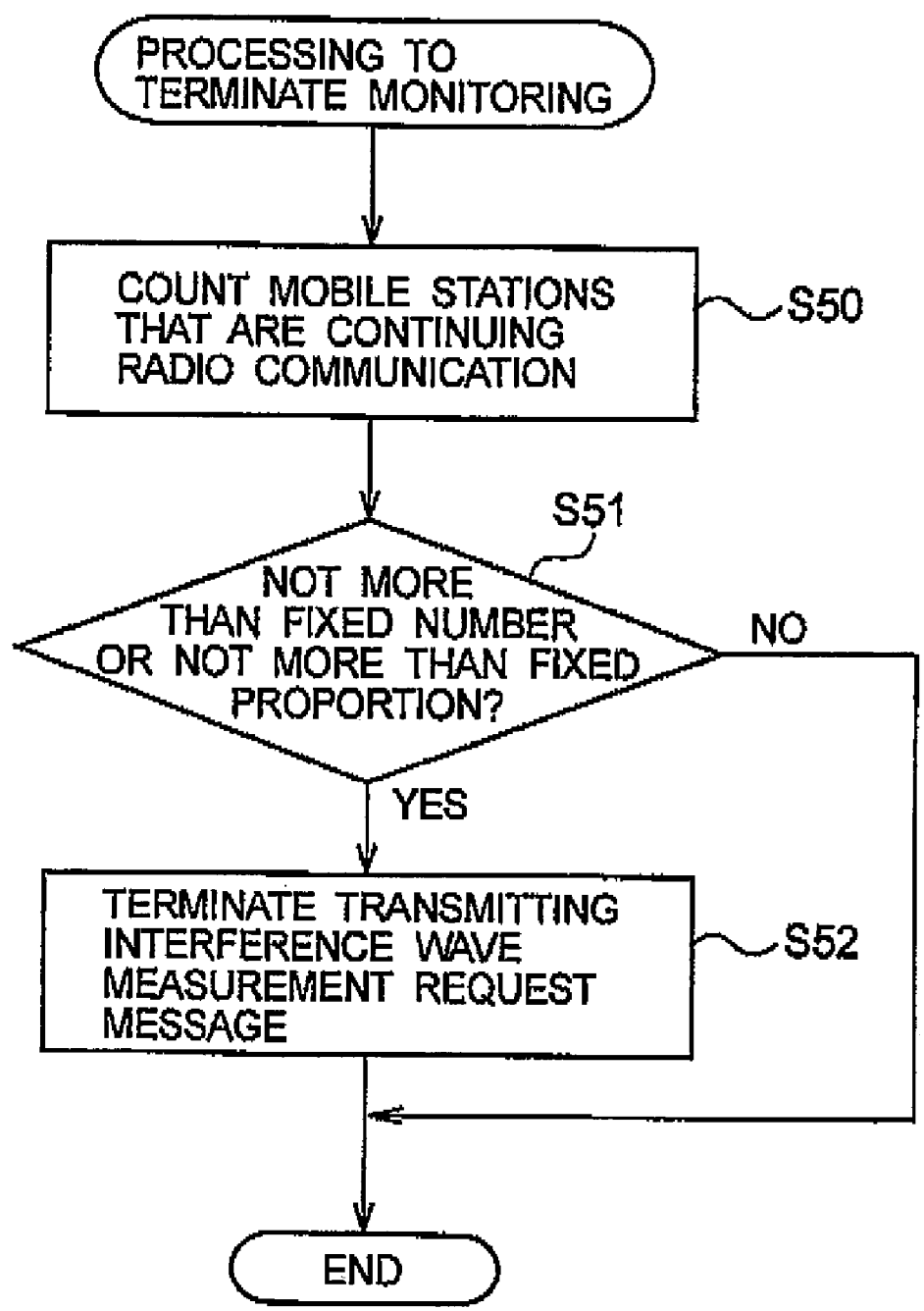
FIG. 10 is a flow chart showing the operation of the base station 100 according to the first embodiment of the present invention (part 3).

Next, processing to give an instruction to terminate monitoring of the reception power (monitoring termination processing) will be described. As shown in FIG. 10, at Step 50, of the mobile stations 10 instructed to switch the frequency used in the radio communication to the frequency not interfered with by the interference signal (frequency e), the base station 100 counts the number of the remaining mobile stations 10 that are still continuing the radio communication with the base station 100.

In other words, of the mobile stations 10 that are evacuated to the frequency not interfered with by the interference signal (frequency e), the base station 100 counts the number of the mobile stations 10 that are located within the sector 1a managed by the base station 100, and are continuing the radio communication.

As mentioned above, the mobile station 10 that is located within the sector 1a managed by the base station 100 and is continuing the radio communication is managed in the handoff management DB 150 of the base station 100.

At Step 51, the base station 100 determines whether the number of the mobile stations 10 counted at Step 50 is not more than a fixed number, or whether the proportion of the number of the mobile stations 10 counted at Step 50 to the total of the mobile stations 10 evacuated to the frequency not interfered with by the interference signal (frequency e) is not more than a fixed proportion. When the number of the mobile stations 10 counted at Step 50 is not more than the fixed number, or when the proportion of the mobile stations 10 counted at Step 50 is not more than the fixed proportion, the base station 100 goes to processing of Step 52. On the other hand, when the number of the mobile stations 10 counted at Step 50 is larger than the fixed number, and when the mobile station 10 counted at Step 50 has a larger proportion than the fixed proportion, the base station 100 terminates the monitoring termination processing (that is, the base station 100 causes the mobile station 10 to continue the monitoring of the reception power of the interference signal). The criterion in the processing of Step 50 may be either of "not more than the fixed number" and "not more than the fixed proportion."

At Step 52, the base station 100 instructs the mobile station 10 to terminate the monitoring of the reception power of the interference signal, the mobile station 10 having being instructed to switch the frequency used in the radio communication to the frequency not interfered with by the interference signal (frequency e). Specifically, the base station 100 terminates the transmitting of the interference wave measurement request message to the mobile station 10 evacuated to the frequency not interfered with by the interference signal (frequency e).

The base station 100 may give the instruction to terminate the monitoring of the reception power of the interference signal only to the mobile station 10 that is located within the sector 1a managed by the base station 100 and is continuing the radio communication.

Figure 11:
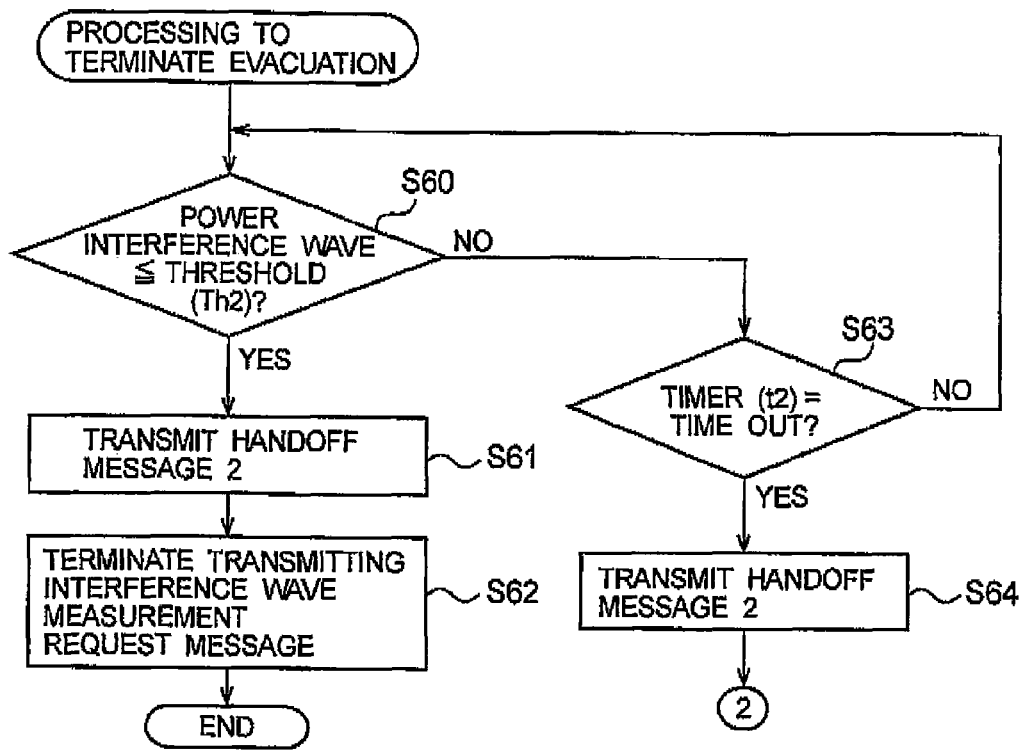
FIG. 11 is a flow chart showing the operation of the base station 100 according to the first embodiment of the present invention (part 4).

Finally, processing to return the frequency used in the radio communication (evacuation termination processing) will be described. As shown in FIG. 11, at Step 60, the base station 100 determines whether the reception power of the interference signal included in the interference wave measurement response message is not more than the predetermined threshold (Th2). When the reception power of the interference signal is not more than the predetermined threshold (Th2), the base station 100 goes to processing of Step 61. When the reception power of the interference signal is larger than the predetermined threshold (Th2), the base station 100 goes to processing of Step 63.

At Step 61, the base station 100 transmits the handoff message 2 to the mobile station 10 that has transmitted the interference wave measurement response message, the reception power of the interference signal included in which is not more than the predetermined threshold (Th2). The handoff message 2 is a message that gives an instruction to switch the frequency used in the radio communication back to the original frequency that may be interfered with by the interference signal (frequency a).

At Step 62, the base station 100 gives an instruction to terminate the monitoring of the reception power of the interference signal to the mobile station 10 to which the base station 100 has instructed to switch the frequency used in the radio communication back to the original frequency that may be interfered with by the interference signal (frequency a). Specifically, the base station 100 terminates the transmitting of the interference wave measurement request message to the mobile station 10 that is the destination to transmit the handoff message 2.

At Step 63, the base station 100 determines whether the timer (t2) has timed out. When the timer (t2) has timed out, the base station 100 goes to processing of Step 64. When the timer (t2) has not timed out, the base station 100 returns to the processing of Step 60.

At Step 64, the base station 100 transmits the handoff message 2 to the mobile station 10 associated with the timer (t2) that has timed out.

Effects and Advantages

According to the base station 100 according to the first embodiment of the present invention, when the radio communication performed by using the frequency assigned to the first radio communication system (frequency a) is interrupted, the monitor instruction unit 130 instructs the mobile station 10 to monitor the reception power of the interference signal transmitted by using the frequency assigned to the second radio communication system (frequency b).

In this way, when the radio communication is interrupted by actually being interfered with by the interference signal, the base station 100 instructs the mobile station 10 to monitor the reception power of the interference signal. Therefore, compared with the case where the mobile station always monitors the reception power of the interference signal, increase in the power consumption of the mobile station 10 can be suppressed.

Furthermore, when the reception power of the interference signal, which is monitored by the mobile station 10 when the radio communication is actually interfered by the interference signal, is not less than the predetermined threshold (Th1), the handoff instruction unit 140 of the base station 100 transmits the handoff message 1 to the mobile station 10, the handoff message 1 giving an instruction to switch the frequency used in the radio communication to the frequency not interfered with by the interference signal (frequency e). Therefore, interference from the second radio communication system can be effectively avoided.

Additionally, according to the base station 100 according to the first embodiment of the present invention, when the reception power of the interference signal is not more than the predetermined threshold (Th2), the monitor instruction unit 130 instructs the mobile station 10 to terminate monitoring of the reception power of the interference signal.

Therefore, it is possible to prevent waste of the power consumption caused by continuing monitoring of the reception power of the interference signal although interference due to the interference signal becomes sufficiently small.

Moreover, according to the base station 100 according to the first embodiment of the present invention, when the reception power of the interference signal is not more than the predetermined threshold (Th2), the handoff instruction unit 140 transmits the handoff message 2 to the mobile station 10, the handoff message 2 giving an instruction to switch the frequency used in the radio communication back to the original frequency that may be interfered with by the interference signal (frequency a).

Therefore, when interference due to the interference signal becomes sufficiently small, the frequency used in the radio communication is returned to the original frequency supposed to be used in the radio communication (frequency a). Consequently, the radio communication can be prevented from being concentrated on the frequency not interfered with by the interference signal (frequency e). Thereby, the frequency that may be interfered with by the interference signal (frequency a) can be effectively used.

Furthermore, according to the base station 100 according to the first embodiment of the present invention, after passage of a certain period of time since the handoff instruction unit 140 has transmitted the handoff message 1, the handoff instruction unit 140 transmits the handoff message 2 to the mobile station 10.

Here, after passage of a certain period of time since the handoff message 1 has been transmitted, it is assumed that the mobile station 10 is no longer located within the sector 1a managed by the base station 100, or that the radio communication performed between the mobile station 10 and the base station 100 is already completed.

In such cases, the frequency used in the radio communication is returned to the original frequency supposed to be used in the radio communication (frequency a). Accordingly, the radio communication can be prevented from being concentrated on the frequency not interfered with by the interference signal (frequency e). Thereby, the original frequency supposed to be used in the radio communication (frequency a) can be effectively used.

Moreover, according to the base station 100 according to the first embodiment of the present invention, when, of the mobile station 10 having been instructed to switch the frequency used in the radio communication to the frequency not interfered with by the interference signal (frequency e), the number of the mobile stations 10 that are still continuing the communication with the base station 100 becomes not more than the fixed number (or, not more than the fixed proportion), the mobile station 10 having switched the frequency used in the radio communication to the frequency not interfered with by the interference signal (frequency e) is instructed to terminate monitoring of the reception power of the interference signal.

Here, the mobile station 10 having been instructed to switch the frequency used in the radio communication to the frequency not interfered with by the interference signal (frequency e) continues monitoring the reception power of the interference signal, in order to switch the frequency used in the radio communication back to the frequency supposed to be used in the radio communication (frequency a).

When the mobile stations 10 that are performing the radio communication by using the frequency not interfered with by the interference signal (frequency e) reduces, a possibility that the radio communication concentrates on the frequency not interfered with by the interference signal (frequency e) also reduces.

Accordingly, since termination of monitoring of the reception power of the interference power is instructed in the cases mentioned above, it is possible to suppress waste of the power consumption of the mobile station 10, while reducing the possibility that the radio communication concentrates on the frequency not interfered with by the interference signal (frequency e).

Additionally, according to the base station 100 according to the first embodiment of the present invention, when the number of the mobile stations 10 instructed to switch the frequency used in the radio communication to the frequency not interfered with by the interference signal (frequency e) becomes more than the predetermined determination value, the monitor instruction unit 130 instructs other mobile station 10 to monitor the reception power of the interference signal, the other mobile station 10 performing the radio communication by using the frequency that may be interfered with by the interference signal (frequency a).

Here, when the number of the mobile stations 10 instructed to switch the frequency used in the radio communication to the frequency not interfered with by the interference signal (frequency e) becomes more than the predetermined determination value, this implies that the interference signal largely interferes with the radio communication performed by using the frequency that may be interfered with by the interference signal (frequency a).

In such a case, the instruction to monitor the reception power of the interference signal is given to the other mobile station 10 that performs the radio communication by using the frequency that may be interfered with by the interference signal (frequency a). Thereby, interference from the second radio communication system can be effectively avoided.

(Second Embodiment)

Hereinafter, a radio communication system according to a second embodiment of the present invention will be described with reference to the drawing. Differences between the first embodiment mentioned above and the second embodiment will be mainly described below.

Specifically, in the first embodiment mentioned above, the mobile station 10 starts monitoring of the reception power of the interference signal when receiving the interference wave measurement request message from the base station 100. On the other hand, in the second embodiment, the mobile station 10 starts monitoring of the reception power of the interference signal when detecting interruption of the radio communication without receiving the interference wave measurement request message from the base station 100.

(Operation of First Radio Communication System)

Hereafter, operation of the first radio communication system according to the second embodiment of the present invention will be described with reference to the drawing. FIG. 12 is a sequence diagram showing the operation of the first radio communication system according to the second embodiment of the present invention.

FIG. 12 corresponds to FIG. 7 mentioned above. Since processing of Step 72 to Step 80 is the same as that of Step 12 to Step 20, description thereof will be omitted.

At Step 70, the mobile station 10 detects interruption of the radio communication performed between the mobile station 10 and the base station 100. As similar to the first embodiment mentioned above, "interruption of the radio communication" means a state where the mobile station 10 and the base station 100 having been temporality unable to be synchronized with each other at a physical layer go back to a state of being synchronized with each other at the physical layer within a certain period of time since a session is not disconnected at a layer of higher order than the physical layer.

When interruption of the radio communication is detected, the mobile station 10 starts monitoring of the reception power of the interference signal without receiving the interference wave measurement request message from the base station 100 (Step 72).

(Effects and Advantages)

According to the mobile station 10 according to the second embodiment of the present invention, when the radio communication performed by using the frequency assigned to the first radio communication system (frequency a) is interrupted, the monitor 13 monitors the reception power of the interference signal transmitted using the interference frequency assigned to the second radio communication system (frequency b).

In this way, the mobile station 10 monitors the reception power of the interference signal when the radio communication is interrupted by being actually interfered with by the interference signal. Thereby, it is possible to suppress increase in the power consumption of the mobile station 10 as compared with the case where the reception power of the interference signal is always monitored.

Additionally, in response to the handoff message 1 that the base station 100 transmits in accordance with the reception power of the interference signal monitored by the mobile station 10 when the radio communication is actually interfered with by the interference signal, the mobile station 10 performs the handoff processing to switch the frequency used in the radio communication to the frequency not interfered with by the interference signal (frequency e). Thereby, interference from the second radio communication system can be effectively avoided.

(Other Embodiment)

While the present invention has been described according to the embodiments mentioned above, it should not be understood that the statement and drawings that constitute a part of this disclosure limit this invention. Various alternative embodiments, examples, and techniques for implementation will be apparent to those skilled in the art from this disclosure.

For example, in the embodiments mentioned above, the signal that the mobile station 20 transmits by using the frequency b is used as an example of the interference signal that interferes with the radio communication performed between the mobile station 10 and the base station 100. However, the interference signal is not limited to this. In other words, the interference signal may be the signal that the base station 200 transmits by using the frequency d.

Alternatively, the base station 100 (monitor instruction unit 130) may give an instruction to terminate monitoring of the reception power of the interference signal after passage of a certain period of time since the base station 10 has given an instruction to monitor the reception power of the interference signal.

Furthermore, in the first embodiment mentioned above, the base station 100 (monitor instruction unit 130) periodically transmits the interference wave measurement request message, but it is not limited to this. For example, when the base station 100 transmits the interference wave measurement request message once, the mobile station 10 may be configured to continue monitoring of the reception power of the interference signal until being instructed to terminate monitoring of the reception power of the interference signal.

Whole contents of Japanese Patent Application No. 2006-89136 (filed on Mar. 28, 2006) are incorporated herein by reference.

INDUSTRIAL APPLICABILITY

As mentioned above, the mobile station and the base station according to the present invention can suppress increase in the power consumption of the mobile station included in the first radio communication system, and simultaneously, can avoid interference from the second radio communication system effectively, and therefore, are useful in the radio communications, such as mobile communications.

The invention claimed is:

1. A mobile station capable of communicating with a first radio communication system in a communication system formed of the first radio communication system and a second radio communication system, the mobile station comprising: a communication unit configured to perform radio communication with a base station of the first radio communication system; a monitor configured to monitor a reception power of an interference signal that is transmitted using a frequency assigned to the second radio communication system and that interferes with the radio communication performed using a first frequency, wherein the monitor begins monitoring when the radio communication with the base station performed using the first frequency is interrupted; a notification unit configured to notify the base station of the reception power monitored by the monitor; and a handoff processor configured to perform handoff processing to switch the frequency used in the radio communication to a second frequency not interfered with by the interference signal in response to a handoff instruction transmitted by the base station having been notified of the reception power by the notification unit.

2. The mobile station according to claim 1, wherein
the first frequency is a frequency used by the communication unit to receive a downlink signal, and
the frequency used to transmit the interference signal is a frequency used by the second radio communication system to transmit an uplink signal.

3. A base station included in a first radio communication system in a communication system formed of the first radio communication system and a second radio communication system, the base station comprising:
a communication unit configured to perform radio communication with a mobile station capable of communicating with the first radio communication system;
a monitor instruction unit configured to instruct the mobile station to monitor a reception power of an interference signal that is transmitted using a frequency assigned to the second radio communication system and that interferes with the radio communication performed using a first frequency, wherein the monitoring begins when the radio communication with the mobile station performed using the first frequency is interrupted; and
a handoff instruction unit configured to instruct the mobile station to switch the frequency used in the radio communication to a second frequency not interfered with by the interference signal, in accordance with the reception power monitored by the mobile station.

4. The base station according to claim 3, wherein
the monitor instruction unit instructs the mobile station to monitor the reception power even after the handoff instruction unit gives an instruction to switch the frequency used in the radio communication to the second frequency, and
the handoff instruction unit instructs the mobile station to switch the frequency used in the radio communication to the first frequency, in accordance with the reception power monitored by the mobile station.

5. The base station according to claim 3, wherein the monitor instruction unit instructs the mobile station to terminate the monitoring of the reception power when the handoff instruction unit gives an instruction to switch the frequency used in the radio communication to the first frequency.

6. The base station according to claim 3, wherein the monitor instruction unit instructs the mobile station to terminate the monitoring of the reception power when a certain period of time has passed after giving the instruction to monitor the reception power.

7. The base station according to claim 3, wherein the handoff instruction unit instructs the mobile station to switch the frequency used in the radio communication to the first frequency when a certain period of time has passed after giving the instruction to switch the frequency used in the radio communication to the second frequency.

8. The base station according to claim 3, wherein
the handoff instruction unit instructs a plurality of mobile stations to switch the frequency used in the radio communication to the second frequency, and
in accordance with a number of the remaining mobile stations that are still continuing the radio communication out of the plurality of mobile stations instructed to switch the frequency used in the radio communication to the second frequency, the monitor instruction unit instructs the plurality of mobile stations instructed to switch the frequency used in the radio communication to the second frequency to terminate monitoring of the reception power.

9. The base station according to claim 3, wherein
the handoff instruction unit instructs a plurality of mobile stations to switch the frequency used in the radio communication to the second frequency, and
in accordance with the number of the mobile stations instructed to switch the frequency used in the radio communication to the second frequency, the monitor instruction unit instructs other mobile station included in the first radio communication system to monitor the reception power.

* * * * *